(12) United States Patent
Kim (10) Patent No.: US 6,220,911 B1
(45) Date of Patent: Apr. 24, 2001

(54) METHOD AND DEVICE FOR ENGAGING AND DISENGAGING A DISPLAY DEVICE FROM A CONVEYOR BELT

(75) Inventor: Jeong-Kyu Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,312

(22) Filed: Dec. 30, 1998

(30) Foreign Application Priority Data

Dec. 30, 1997 (KR) .................................................. 97-78241

(51) Int. Cl.[7] .................................................. H01J 9/42
(52) U.S. Cl. .................................................. 445/3; 445/63
(58) Field of Search ............................................ 445/3, 63

(56) References Cited

U.S. PATENT DOCUMENTS

| | | | |
|---|---|---|---|
| 4,902,258 | * | 2/1990 | Dunsmore et al. ..................... 445/23 |
| 4,971,588 | * | 11/1990 | Nishiyama ................................ 445/3 |
| 5,547,069 | | 8/1996 | Pritchard . |
| 5,607,282 | | 3/1997 | Brannen et al. . |
| 5,680,925 | | 10/1997 | Gallagher et al. . |
| 5,727,669 | | 3/1998 | Rich, Jr. . |
| 5,829,924 | | 11/1998 | Beers . |
| 5,986,696 | * | 11/1999 | Shin ..................................... 348/190 |

FOREIGN PATENT DOCUMENTS

405282998 * 10/1993 (JP) ......................................... 445/3

* cited by examiner

*Primary Examiner*—Kenneth J. Ramsey
(74) *Attorney, Agent, or Firm*—Robert E. Bushnell, Esq.

(57) ABSTRACT

A device and a method for removing and re-engaging display devices with a conveyor belt system to facilitate tilt testing eliminates much of the manual labor associated with performing a tilt test. The device combines a fixture with a set of cameras to perform a tilt test using a tilt test pattern that is displayed on the screen of the cathode ray tube. The device and method allow an efficient tilt testing to be performed while minimizing the work process and time period for tilt testing, thus enhancing productivity. Furthermore, the time delay normally caused by the manual carrying of the display device by workers is reduced, along with the associated damage to the display devices. As a result, the overall level of quality of the image display devices that are produced can be increased.

19 Claims, 8 Drawing Sheets

METHOD AND DEVICE FOR ENGAGING AND DISENGAGING A DISPLAY DEVICE FROM A CONVEYOR BELT

CLAIM OF PRIORITY

This application makes reference to, incorporates the same herein, and claims all rights accruing thereto under 35 U.S.C. §119 through my patent application entitled Automatic Mountintg/Dismounting Method and Apparatus for an Image Display Device earlier filed in the Korean Industrial Property Office on the 30th day of Dec. 1997 and there duly assigned Ser. No. 1997/78241.

BACKGROUND OF THE INVENTION

1. Field of the Invention

The present invention relates to an automatic mounting/dismounting method and apparatus for an image display device in which a cathode ray tube assembly is automatically mounted/dismounted onto/from a process line for checking and correcting a tilt of an image display device like cathode ray tube assembly.

2. Background Art

Generally, an image display device, for example, a cathode ray tube, is for monitoring 1s various image signals and has to undergo some checking and adjustment during manufacture to correctly display the image signals received by the display device. The checking of the relative position of the cathode ray tube versus the front housing, also referred to as the tilt of the display device, is usually checked while the display device is being conveyed along a conveyor belt on a pallet. Some techniques for conveying objects using conveyor belt systems are shown, for example, in U.S. Pat. No. 5,680,925 to Gallagher entitled Conveyor Belt Lift Apparatus, U.S. Pat. No. 5,829,942 to Beers entitled Apparatus for Loading and Unloading Circuit Boards Along a Conveyor System, U.S. Pat. No. 5,727,669 to Rich, Jr. entitled Method and Apparatus for Transferring Pallletized Loads, U.S. Pat. No. 5,547,069 to Pritchard entitled Modular Cargo Drive Unit for a Conveyor, and U.S. Pat. No. 5,607,282 to Brannen entitled Depalletizing and Dispensing Apparatus and Method.

The cathode ray tube and the front case are adjusted to have the proper relative positioning, or tilt, prior to the attachment of the front case to the cathode ray tube. Unfortunately, however, the relative position often needs further adjustment before the front housing and the cathode ray tube are further secured to each other. To test the relative position of the cathode ray tube and the front housing, a worker removes the display device from the conveyor belt and checks the tilt of the monitor and makes the necessary adjustments. Afterwards, the worker places the monitor back on the conveyor belt. Disadvantages of requiring a worker to remove the cathode ray tube to check the Is tilt of a display device include requiring a worker to manually move the display device to check the tilt, the increased risk incurred of damage to the cathode ray tube during the manual carrying of the monitor by the worker, and the increased number of workers required to accurately test a large production line of monitors.

As such, I believe it may be possible to improve on the contemporary art by providing a device and a method for engaging and disengaging a display device from a conveyor belt that eliminates the need for manual transportation of the monitor by the worker, that allows a worker to test the tilt of a monitor. that allows a worker to adjust the tilt of the monitor, and that increases the efficiency of display device manufacture.

SUMMARY OF THE INVENTION

Accordingly, it is an object of the present invention to provide a device and a method for engaging and disengaging a display device from a conveyor belt that eliminates the need for the manual transportation of the display device by the worker.

It is another object to provide a device and a method for engaging and disengaging a display device from a conveyor belt that allows the worker to test the tilt of the display device.

It is still another object to provide a device and a method for engaging and disengaging a display device from a conveyor belt that reduces the time necessary to perform a tilt test.

It is yet another object to provide a device and a method for engaging and disengaging a display device from a conveyor belt that eliminates the damage to the display devices that is associated with the manual carrying of the display devices by workers.

It is still yet another object to provide a device and a method for engaging and disengaging a display device from a conveyor belt that enhances the quality of display devices manufactured.

These and other objects may be achieved using a method of mounting and dismounting a display device from a conveyor belt. First, a fixture for supporting an image display device is elevated up to below a conveyor belt while the display device is loaded onto the conveyor belt. When the display device is completely loaded onto the conveyor belt, the fixture is elevated above the conveyor belt to engage the display device with the fixture. Then, a pattern for testing the degree of tilt is provided to the display device, and the degree of tilt is checked and corrected. The fixture is lowered below the conveyor belt, and the display device is re-engaged with the conveyor belt.

In addition, the introduction of the image display device is sensed prior to the elevation of the fixture to a position below the conveyor belt, and the complete introduction of the image display device is sensed prior to the mounting of the image display device onto the fixture.

According to another method of automatic mounting/dismounting of the present invention, when the image display device is completely introduced to the conveyor belt, the conveyor belt is lowered down to below the fixture so as to mount the image display device onto the fixture. Then, a pattern for testing the degree of tilt is provided to the mounted image display device, and the degree of tilt is checked and corrected. The conveyor belt is elevated up to above the fixture, and the image display device is dismounted from the fixture and is transported by the conveyor belt.

To check and correct the degree of tilt of the cathode ray tube assembly according to the present invention, the fixture for supporting the cathode ray tube assembly is elevated up to below the conveyor belt during the cathode ray tube assembly where a front case and a cathode ray tube are not yet assembled is introduced onto the conveyor belt. When the cathode ray tube assembly is completely introduced onto the conveyor belt, the fixture is elevated up to above the conveyor belt so as to mount the cathode ray tube assembly onto the fixture. Then, a high voltage, a deflection voltage, and a tilt testing pattern is provided to the mounted cathode ray tube so as to display a pattern image onto the cathode ray tube. The pattern image is compared with the reference pattern marked to the cathode ray tube so as to adjust the degree of tilt to have the same degree of tilt. Then, the front case and the cathode ray tube are assembled, and the fixture is lowered down to below the conveyor belt so as to dismount the assembled cathode ray tube assembly from the fixture and transport the same by the conveyor belt.

An automatic mounting/dismounting apparatus according to an embodiment of the present invention is separated from a first, a second, and a third conveyor belt by a regular space, and includes a sensor for sensing when the image display device is introduced, mounted and ejected, a fixture on which the image display is mounted, and a fixture elevating member for moving the fixture onto or below the conveyor belt in accordance with a signal output from the sensor so as to mount/dismount the image display device onto/from the conveyor belt.

Here, the sensor is made up of a first sensor for sensing that the image display device is being introduced onto the conveyor belt, a second sensor for sensing whether the image display device is completely ejected from the conveyor belt or the image display device is completely introduced onto the conveyor belt, and a third sensor for sensing that the checked image display device is completely ejected from the third conveyor belt.

The fixture used in the present invention has a size corresponding to those of the image display device. In addition, an aperture through which the conveyor belt passes is formed at the center of the fixture, and protrusions for fixing the image display device are formed at the four corners of the fixture. A pair of protrusions formed in the front is lower than those formed in the rear, being based on the direction in which the image display device proceeds.

Preferably, a cushion member for protecting the cathode ray tube assembly being transported is inserted between the conveyor belt and the cathode ray tube assembly. The cushion member is that the portion thereof cortesponding to the protrusion is removed and the center thereof is opened so that the screen of the image display device can be seen.

In addition, the fixture elevation means includes a transportation rod one end portion of which is coupled to the lower portion of the fixture, and a cylinder to which another end portion of the transportation rod is coupled so as to linearly move the transportation rod.

An automatic mounting/dismounting apparatus according to another embodiment of the present invention includes a sensor which is separated from the first, second, and the third conveyor belts by a regular space and senses when the image display device is introduced, mounted and ejected, a fixture onto which the image display device is mounted, and an elevation means which moves the conveyor belt onto or under the fixture in accordance with the signal output from the sensor and mounts/dismounts the image display device onto/from the conveyor belt.

The elevation means includes a transportation rod one end portion of which is coupled to the lower portion of the conveyor belt, and a cylinder to which another end portion of the transportation rod is coupled so as to linearly move the transportation rod.

A system for checking and correcting the degree of tilt of the cathode ray tube assembly according to the present invention includes a sensor which is separated from the first conveyor, second conveyor, and the conveyor belts by a regular space and senses when the image display device is introduced, mounted and ejected, a fixture onto which the image display device is mounted, a fixture elevation means which moves the fixture onto or below the conveyor belt in accordance with the signal output from the sensor and mounts/dismounts the image display device onto/from the conveyor belt, a pattern image forming member for forming a pattern image by providing the image display device with a high voltage, a deflection voltage, and a tilt testing pattern, charge coupled device (CCD) cameras installed below the fixture in order to pickup the pattern image and provide the same to a test monitor, and a case which accommodates the fixture elevation means and the CCD cameras and which includes a lower case located below the conveyor belt and a back case that accommodates the pattern image forming member and is located behind the conveyor belt.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
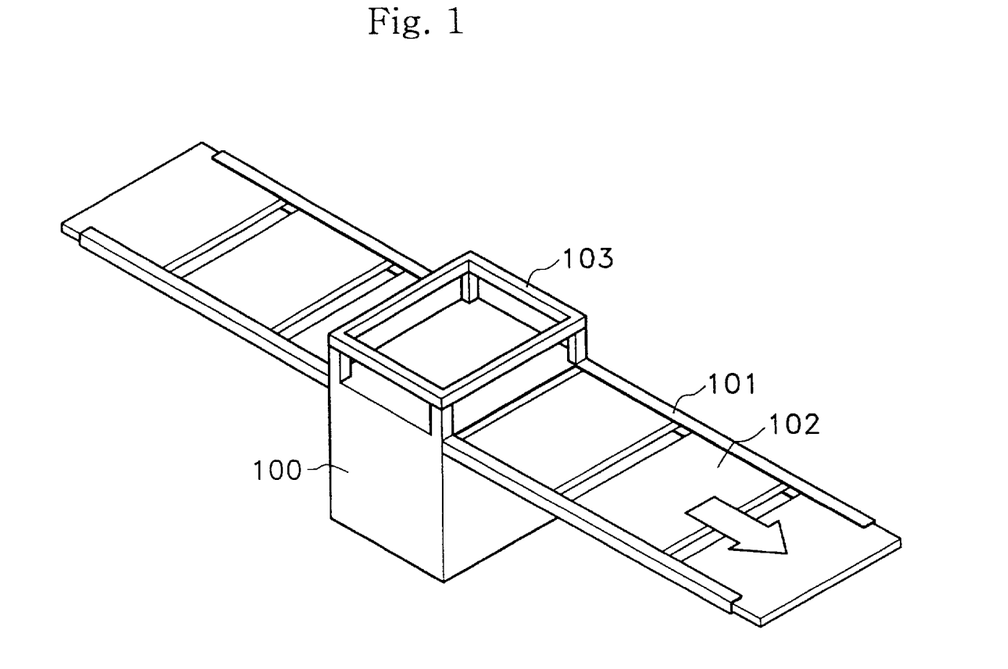
FIG. 1 is a schematic view showing a tilt adjusting apparatus and a conveyorbelt for adjusting the degree of the tilt of the cathode ray tube.
Figure 2A:
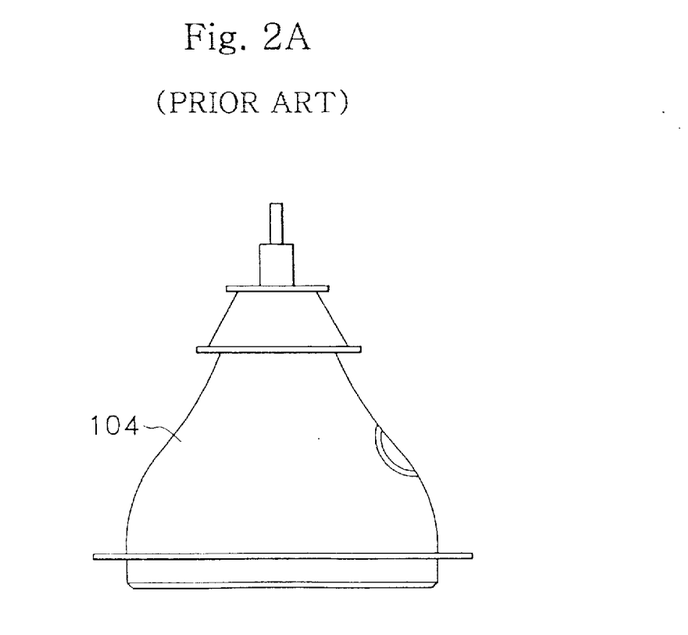
FIG. 2A is a perspective view showing a to-be-checked cathode ray tube transported by the conveyor belt.
Figure 2B:
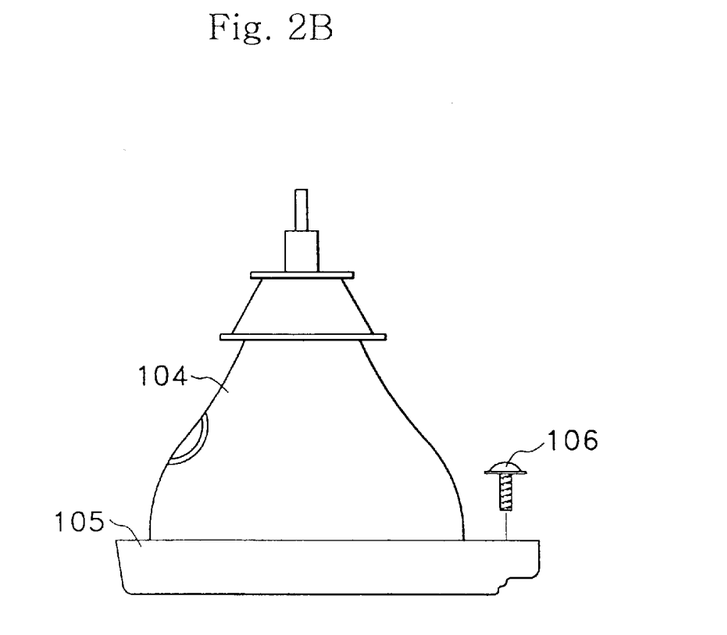
FIG. 2B is a perspective view showing a cathode ray tube assembly where the cathode ray tube is assembled to a front case.
Figure 2C:
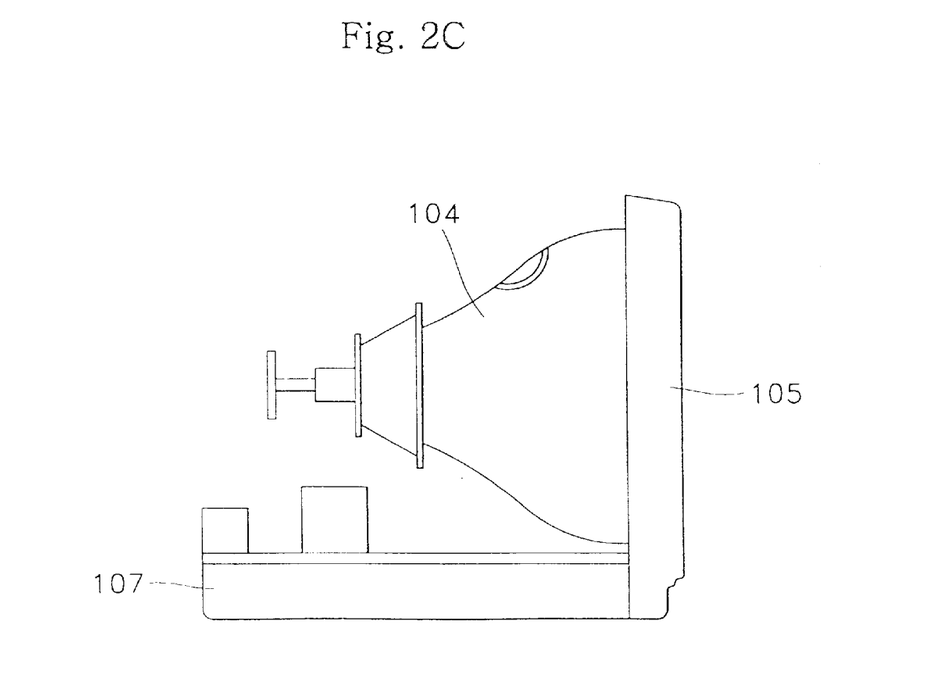
FIG. 2C is a perspective view showing the cathode ray tube assembly and a printed circuit board assembly.
Figure 2D:
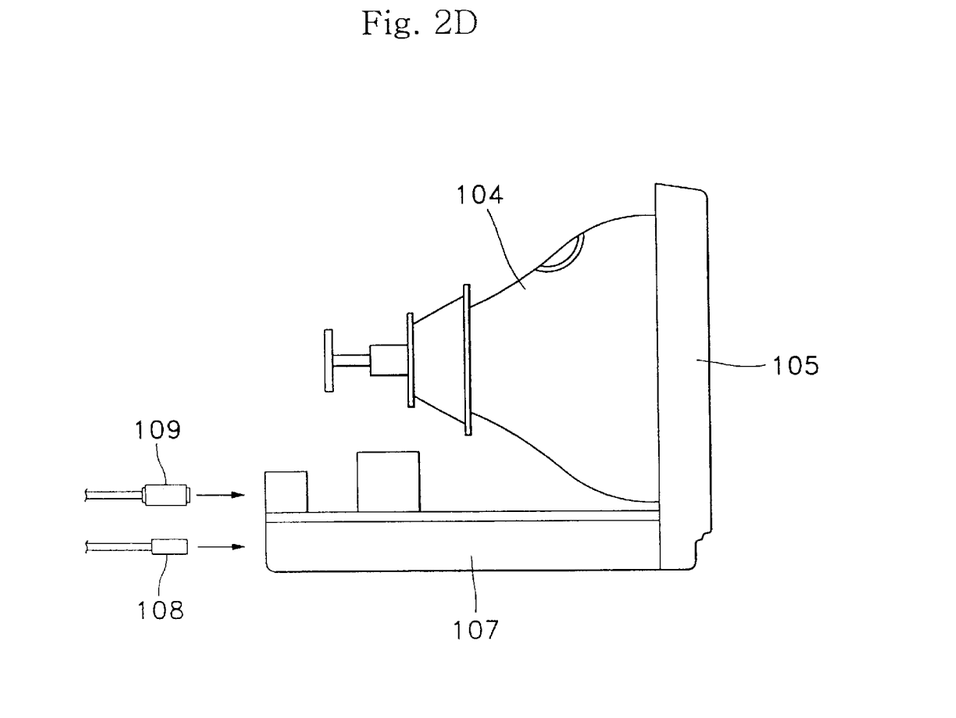
FIG. 2D is a perspective view showing the cathode ray tube assembly to which an alternating power and a tilt testing pattern are provided.
Figure 2E:
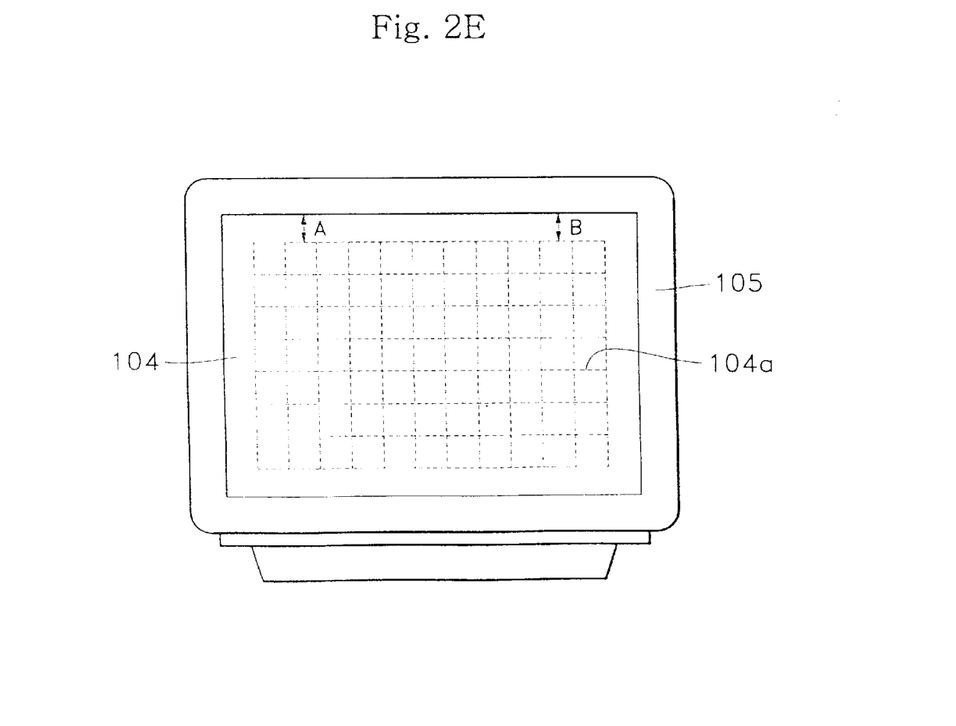
FIG. 2E illustrates checking of the degree of the tilt by the space between the front case and the tilt testing pattern.

Turning now to the drawings, FIGS. 1 through 2E illustrate the checking and adjusting of the tilt in a display device. First, cathode ray tube 104, as shown in FIG. 2A, is mounted onto pallet 102, shown in FIG. 1, and is transported by conveyor belt 101 to adjust the degree of the tilt of the image display device. A worker fixes front case 105 to cathode ray tube 104 by using fastener 106, as shown in FIG. 2B, and transports it to the subsequent station along the manufacturing line on pallet 102 via conveyor belt 101.

Then, as shown in FIG. 2C, the worker couples printed circuit board assembly 107 to the cathode ray tube assembly where cathode ray tube 104 and front case 105 are joined. Then, the cathode ray tube assembly is put on pallet 102 and is transported by the conveyor belt 101 to the subsequent station along the manufacturing line, where a tilt adjusting apparatus is installed.

When the cathode ray tube assembly coupled with printed circuit board assembly 107 is transported by conveyor belt 101, the worker at the tilt adjusting apparatus (not shown) picks up the cathode ray tube assembly from pallet 102 and puts the cathode ray tube assembly onto a fixture (not shown). Then, as shown in FIG. 2D, alternating current cable 108 and a signal supply cable 109 are inserted into printed circuit board assembly 107 to provide a test pattern for testing the tilt, also referred to as the relative position of the cathode ray tube to the front housing.

If the cathode ray tube assembly is being supplied with power and a test pattern, then test pattern 104a as shown in FIG. 2E is displayed on the screen of cathode ray tube 104. This allows the worker to check whether the upper frame line of front case 105 is parallel with the lines formed by test pattern 104a. That is, the worker checks using his eyes whether distances "A" and "B" between the upper frame of front case 105 and pattern 104a are the same. If the distances are not the same, the worker removes fastener 106 which secures front case 105 to cathode ray tube 104, and adjusts the degree of the tilt so that the distances between the upper frame of front case 105 and test pattern 104a of the cathode ray tube are the same. Then, the worker again tightens fastener 106 to finally secure cathode ray tube 140 and front case 105.

A device and method, as constructed according to the principles of the present invention, for removing a display device from a conveyor belt and returning the display device to the conveyor belt that simplifies the tilt testing will be detailed with reference to FIGS. 3 through 7.

Figure 3:
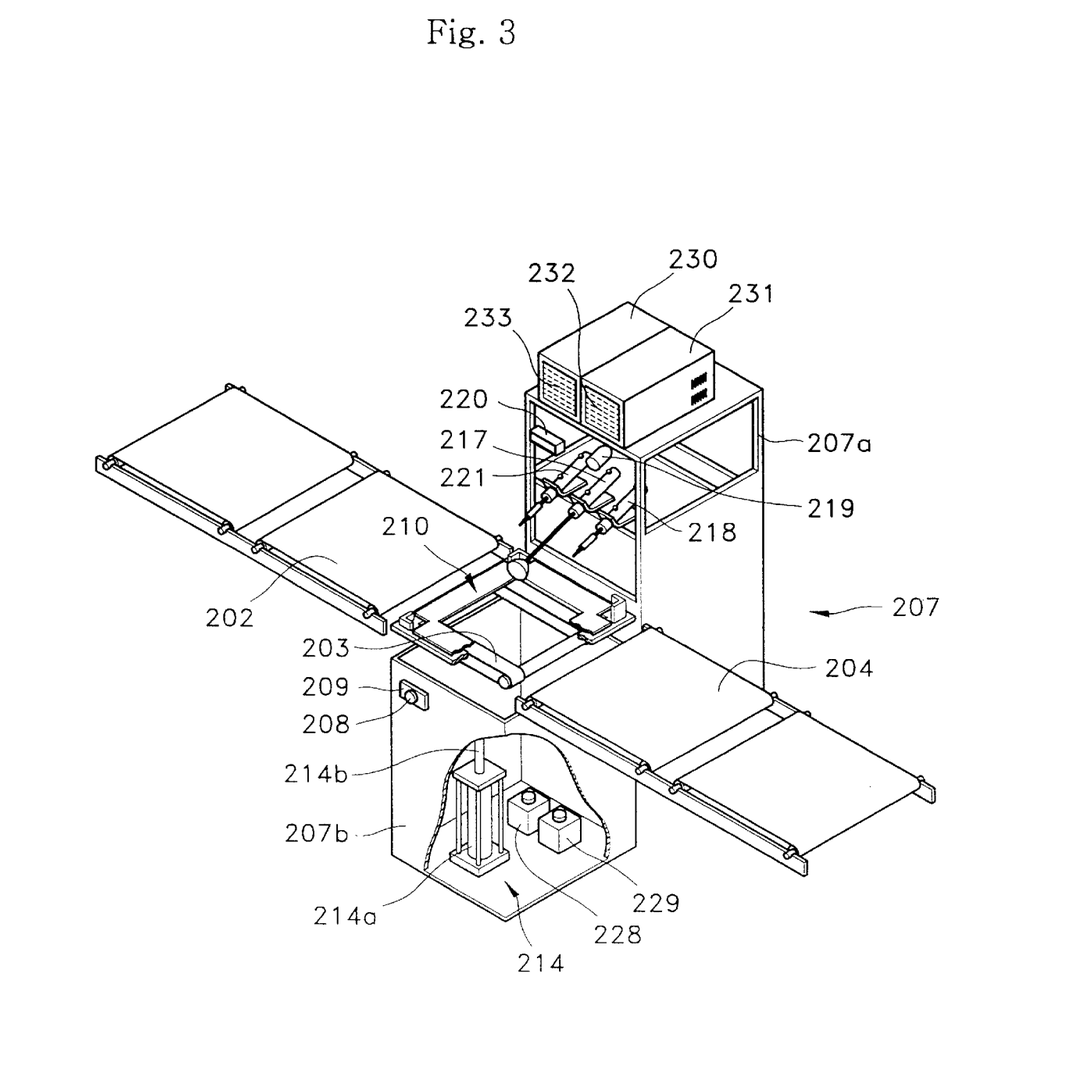
FIG. 3 is a perspective view showing an automatic mounting/dismounting apparatus for a cathode ray tube assembly according to an embodiment of the present invention.
Figure 6A:
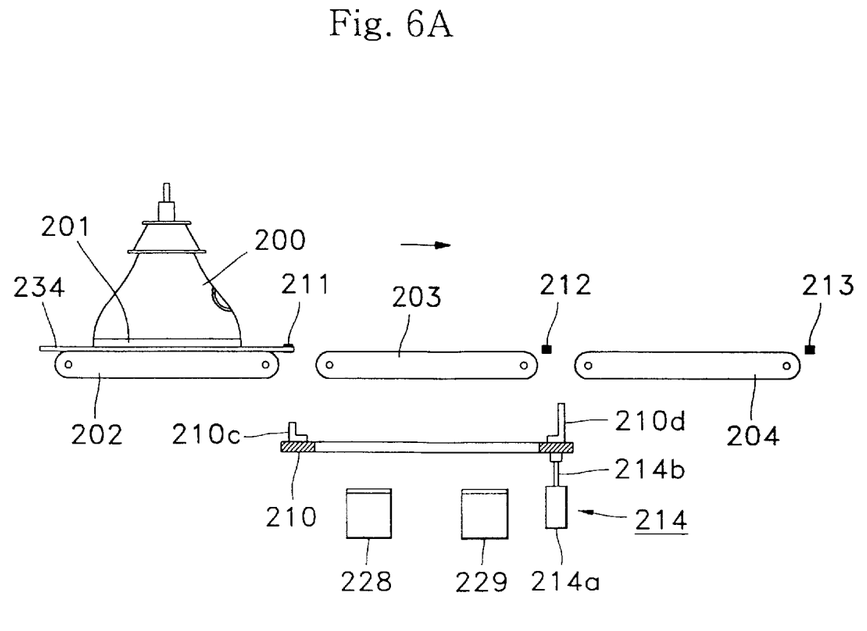
FIG. 6A is a front view showing the to-be-checked cathode ray tube assembly before moving to the fixture.
Figure 6B:
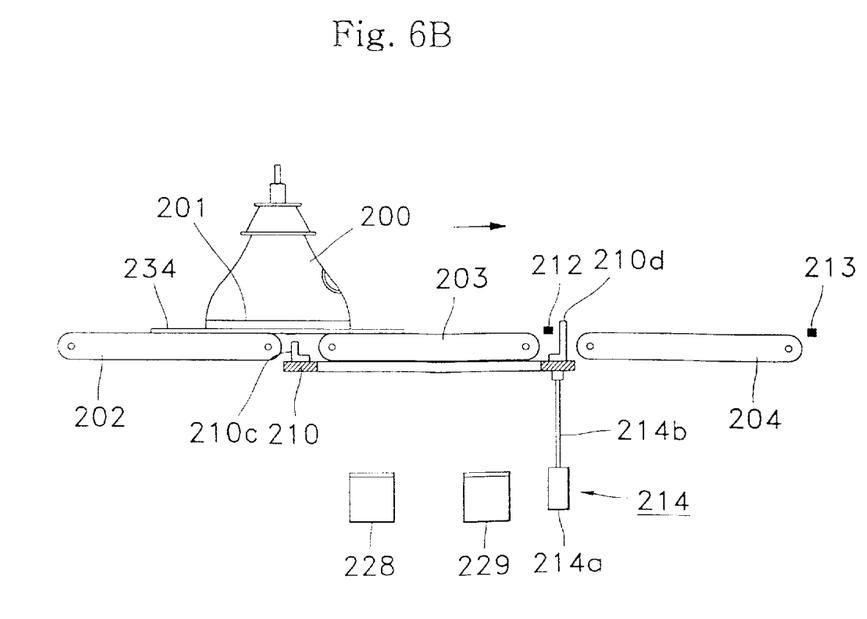
FIG. 6B is a front view showing the to-be-checked cathode ray tube assembly being introduced onto the fixture.
Figure 6C:
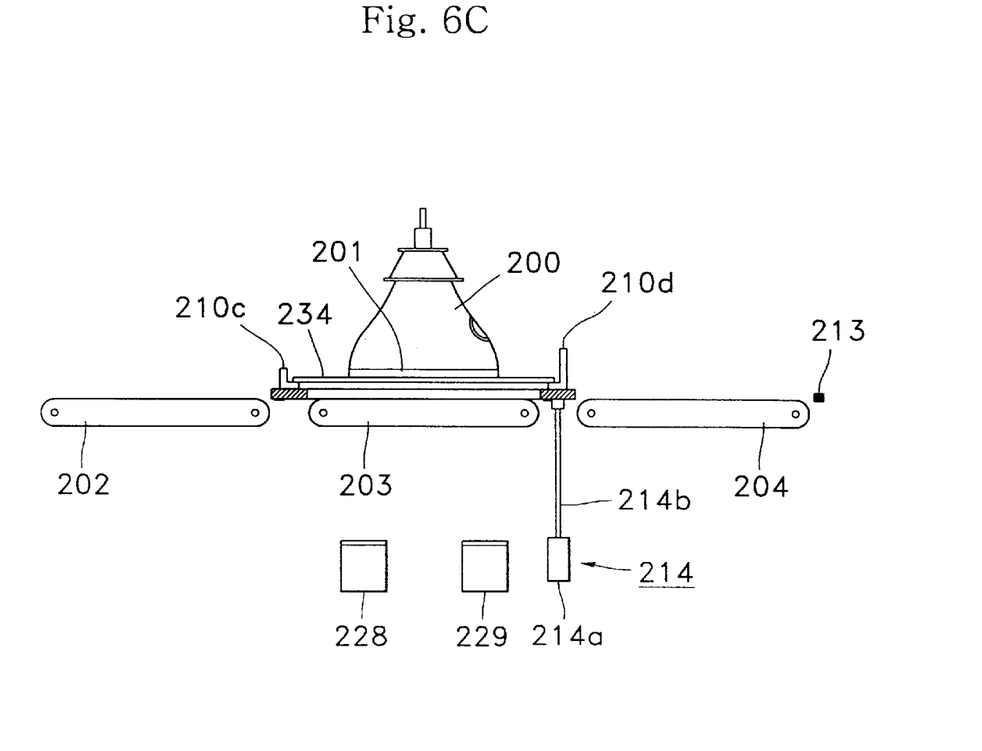
FIG. 6C is a front view showing the to-be-checked cathode ray tube assembly completely introduced onto the fixture.
Figure 7:
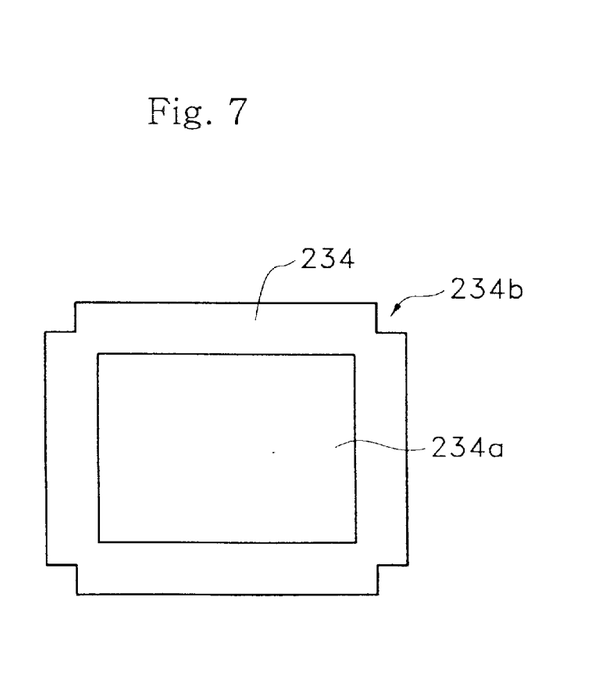
FIG. 7 is a detail plan view showing a cushion member for protecting the screen of the cathode ray tube assembly shown in FIG. 6.

Referring to FIG. 3, first conveyor 202 is joined to second conveyor 204 by a device as constructed according to the principles of the present invention. The device supports conveyor belt 203 that joins the linearly aligned first conveyor and second conveyor. The three conveyors can be used to transport cathode ray tube assembly 200, as shown in FIGS. 6A to 6C. The cathode ray tube assembly is transported by being mounted onto the conveyor belt with cushion member 234, as shown in FIG. 7, inserted between the display device and the conveyor belt. Conveyor belt 203 may be positioned is a little bit lower than the other conveyor belts.

Housing 207 includes first portion 207b that is disposed beneath conveyor belt 203, and second portion 207a that is disposed along the lateral side of conveyor belt 203. The first portion 207b is provided with elevation member 214 and cameras 228, 229, while the second portion 207a is provided with members 217, 218, 219, 220, 221 for testing the degree of tilt and monitors 230, 231 for displaying a pattern image.

Figure 5:
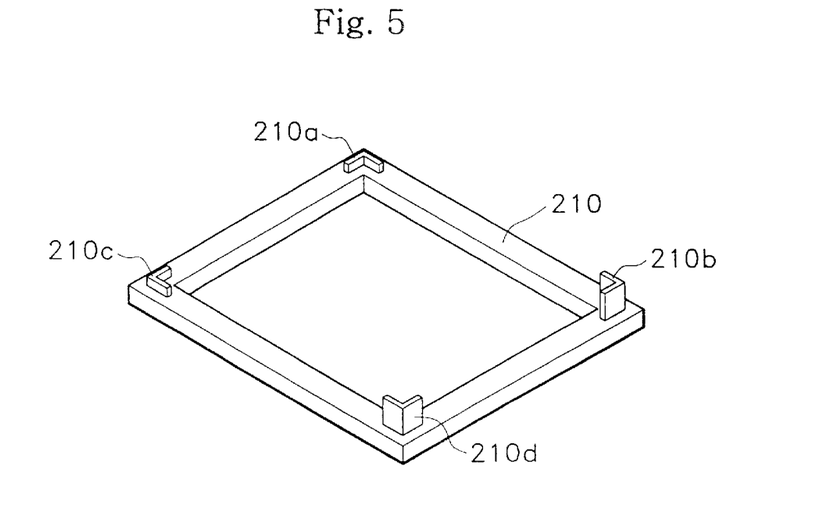
FIG. 5 is a detailed perspective view showing a fixture onto which the cathode ray tube assembly shown in FIG. 3 is mounted.

Start switch 208 and end switch 209 are for driving or stopping the members used to test the degree of tilt that are installed on the front surface of the first portion of the housing 207b. In addition, fixture 210 which moves up and down tinder the control of elevation member 214 is installed on the upper surface of first portion 207b. That is, fixture 210 is connected to transportation rod 214b of elevation member 214 and moves up and down by the operation of cylinder 214a. Referring to FIG. 5, fixture 210 may be square-shaped and is sized corresponding to the size of cathode ray tube assembly 200. Furthermore, first to fourth protrusions 210a, 210b, 210c, 210d are used to firmly engage the front case onto which the cathode ray tube is mounted. The four protrusions are formed on the four corners of fixture 210. The first and third protrusions 210a, 210c through which the cathode ray tube assembly is introduced are lower than the corresponding second and fourth protrusions 210b, 210d.

Figure 4:
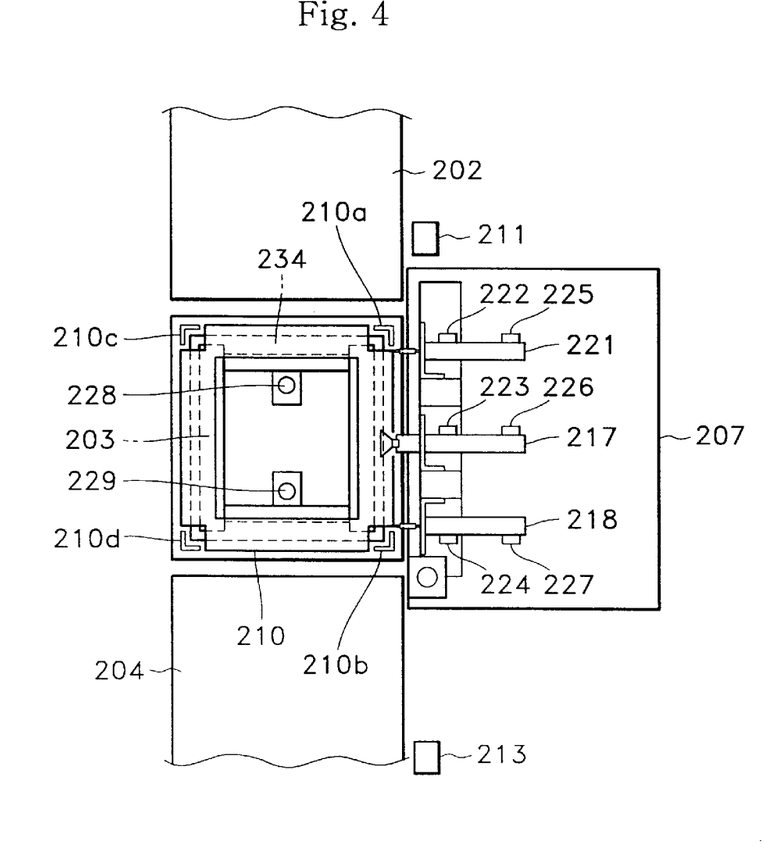
FIG. 4 is a plan view showing the automatic mounting/ dismounting apparatus for a cathode ray tube assembly shown in FIG. 3.

Referring to FIG. 4, cushion member 234, on which cathode ray tube assembly 200 is mounted, is placed so that each edge corresponds to an edge of fixture 210. As shown in FIG. 7, each corner of cushion member 234 is cut away in a corresponding fashion to the first through fourth protrusions 210a through 210d of fixture 210. The center of the cushion member 234 has opening 234a so that the screen of cathode ray tube assembly 200 can be viewed by first and second cameras 228 and 229.

First and second cameras 228 and 229 observe the tilt testing pattern image displayed on the screen of cathode ray tube assembly 200 and are installed in the interior of first portion 207b of the housing. First and second monitors 230 and 231 display the tilt testing pattern image and are installed on second portion 207a of the housing. Reference patterns 232, 233 for a comparison of the degree of tilt with respect to the tilt testing pattern image are marked horizontally onto the screens of the monitors 230, 231.

Referring to FIG. 4, first to third sensors 211, 212, 213 are respectively disposed behind the first conveyor 202, conveyor belt 203, and second conveyor 204. Thus, sensors 211, 212, 213 respectively sense when the cathode ray tube assembly 200 mounted onto front case, or front housing, 201 begins to enter onto conveyor belt 203, is fully aligned over fixture 210, and is fully transported off of conveyor belt 203.

Referring to FIG. 3, anode voltage supply member 217 moves linearly by an operation of start switch 208 to provide an anode of cathode ray tube assembly 200 with a high voltage. A closed circuit forming member 218 contacts a ground portion of the cathode ray tube assembly 200 by an operation of the start switch 208 to form a closed circuit. An aging socket jig 219 is coupleable with a neck portion of cathode ray tube assembly 200 to supply a pre-heating voltage and a tilt testing pattern that is formed by a pattern generating portion. Deflection voltage supply member 220 is coupleable with a deflection yoke connector of cathode ray tube assembly 200 to supply a deflection voltage. A high voltage discharge member 221 contacts the anode of the cathode ray tube assembly 200 by moving linearly after the tilt test is finished, so as to discharge the high voltage.

Referring to FIG. 4, the anode voltage supply member 217, the closed circuit forming member 218, and the high voltage discharge member 221 are provided with front check sensors 222, 223, 224 and rear check sensors 225, 226, 227 respectively for sensing the forward and backward movement of such members.

An automatic mounting and dismounting apparatus of the present invention operates as follows. First, a worker assembles a deflection coil where a deflection yoke corrector is electrically connected and other necessary components to the neck portion of the cathode ray tube assembly 200.

The cathode ray tube assembly 200 is then placed onto the front case 201, and onto the first conveyor belt 202, with cushion member 234 inserted between the display device and the conveyor. Then, cathode ray tube assembly 200 is transported to the position where the tilt adjusting apparatus is located. Here, the cathode ray tube assembly 200 is positioned so that the screen faces the ground.

The third sensor 213 installed in the rear of the second conveyor 204 and senses whether the cathode ray tube assembly 200, for which the tilt test is completed, has completely left conveyor belt 202. Cathode ray tube assembly 200 is transported along first conveyor 202 via pallet 205.

As shown in FIG. 6A, if a signal indicating that the cathode ray tube assembly for which the tilt test is completed has passed over conveyor belt 203 is sensed by a controller (not shown), the cylinder 214a of the elevation member 214 advances a rod 214b so as to elevate the fixture 210 positioned under the second conveyor belt 203, so that the next cathode ray tube assembly 200 that will be newly transported and introduced to conveyor belt 203 can be firmly fixed onto the fixture 210. The elevation of the fixture continues until protrusions 210c, 210d of fixture 210 are nearly in parallel with the upper surface of conveyor belt 203, as shown in FIG. 6B.

Subsequently, the new cathode ray tube assembly 200 is introduced onto first conveyor 202. At this time, if the second sensor 212 installed in the rear of the conveyor belt 203 senses that the cathode ray tube assembly, for which the tilt test is completed, is not yet ejected when the next cathode ray tube assembly 200 is sensed by the sensor 211 installed in the rear of the first conveyor 202, the transportation of the next cathode ray tube assembly 200 stops.

As described above, when the cathode ray tube assembly 200 is introduced onto conveyor belt 203 by the first conveyor 202, first and third protrusions 210a, 210c of fixture 210 have heights nearly parallel with the upper surface of the second conveyor belt 203. Second and fourth protrusions 210b, 210d are higher than the first and third protrusions 210a, 210c and are further protruded than the upper surface of conveyor belt 203. Accordingly, cathode ray tube assembly 200 passes the first and third protrusions 210a, 210c and is then fixed by the second and fourth protrusions 210b, 210d.

Then, second sensor 212 that is disposed in the rear of conveyor belt 203 senses whether the cathode ray tube assembly 200 is completely aligned over fixture 210. If the signal indicating that the cathode ray tube assembly 200 is aligned over fixture 21 0 is sensed, elevation member 214 elevates fixture 210 to fix the next cathode ray tube assembly 200 onto fixture 210, as shown in FIG. 6C.

If the cathode ray tube assembly 200 is completely aligned over fixture 210, each edge of cushion member 234, that is placed under the cathode ray tube assembly 200, is positioned corresponding to each edge of fixture 210. Thus, if fixture 210 is elevated, cathode ray tube assembly 200, along with the cushion member 234, is mounted onto fixture 210 and separated from conveyor belt 203. Moreover, the cathode ray tube assembly 200 is firmly fixed by the first to fourth protrusions 210a to 210d of the fixture 210.

Then, for the tilt test, the worker electrically connects the aging socket jig 219 which is installed in the second portion 207a of the housing by inserting the jig 219 into an electronic gun contained in the neck portion of the cathode ray tube assembly 200. When the aging socket jig 219 is electrically connected to a power terminal of the electronic gun of the cathode ray tube assembly 200, a pre-heat voltage is supplied so as to preheat the heater. When the heater of the cathode ray tube assembly 200 is started to be heated, the worker electrically connects the deflection voltage supply member 220 of the second portion 207a of the housing to the deflection yoke connector of the cathode ray tube assembly 200. In addition, the worker presses the start switch 208 at the front surface of the lower case 207b so as to turn on a power, which provides environments for testing the tilt.

When the start switch 208 is turned on, a main controller (not shown) in the second portion 207a of the housing senses via front check sensors 222 to 224 and the rear check sensors 225 to 227, the state of the closed circuit forming member 218, the anode voltage supply member 217, and the high voltage discharge member 221, as shown in FIG. 4, in order to operate members 218, 217, and 221, in accordance with a program. That is, the main controller senses by the rear check sensor 227 whether the closed circuit forming member 218 is in the backward direction, and if it is, the main controller advances the closed circuit forming member 218 so as to be contact the ground portion of the cathode ray tube assembly 200, to thereby form a closed circuit. Here, compressed air generated from a compressor (not shown) is used as a power source for driving the closed circuit forming member 218, the anode voltage supply member 217, and the high voltage discharge member 221.

Then, the closed circuit forming member 218 proceeds to contact the ground portion of the cathode ray tube assembly 200, and the main controller senses via the front check sensor 224 whether the closed circuit forming member 218 exists to the front. If the front check sensor 224 is turned on, the main controller senses via the rear check sensors 225, 226 whether the high voltage discharge member 221 and the anode voltage supply member 217 exists in the rear.

If the main controller senses that the rear check sensors 225, 226 are turned on, it moves the anode voltage supply member 217 forward so as to contact the anode of the cathode ray tube assembly 200. The closed circuit forming member 218 contacts the ground portion of the cathode ray tube assembly 200 prior to the contact between the anode voltage supply member 217 and the anode of the cathode ray tube assembly 200 because the cathode ray tube assembly 200 is likely to be damaged if only high pressure is supplied by the anode voltage supply member 217. Therefore, the closed circuit forming member 218 contacts the ground portion prior to the contact with the anode voltage supply member 217.

In a state where the closed circuit forming member 218 and the anode voltage supply member 217 are moved forward to respectively contact the ground portion and the anode portion of the cathode ray tube assembly 200, the main controller senses via the front check sensors 223, 224 whether the closed circuit forming member 218 and the anode voltage supply member 217 are attached to the cathode ray tube. If the voltage supply member and the closed circuit member are attached, a printed circuit board assembly (not shown) and a pattern generating unit (not shown) generate a high voltage, a deflection voltage, and a tilt testing pattern.

The high voltage generated from the printed circuit board assembly is supplied by the anode voltage supply member 217 to the anode of the cathode ray tube assembly 200 where the closed circuit forming member 218 forms the closed circuit. The deflection voltage is supplied to the deflection member 220, and the tilt testing pattern signal generated from the pattern generating unit is supplied to the aging socket jig 219 coupled to the neck portion of the cathode ray tube assembly 200.

When the high voltage, i.e., an anode voltage, and a deflection voltage are supplied from the printed circuit board assembly, the cathode ray tube assembly 200 is operated so as to display a pattern image onto a screen. At this time, the worker checks whether the cathode ray tube assembly 200 is normally operated.

If the cathode ray tube assembly 200 operates normally, the main controller controls the first and second cameras 228,229 installed under the fixture 210. The first and second cameras 228, 229 picks up the tilt testing pattern image displayed onto the screen of the cathode ray tube assembly 200, and displays the image onto the first and second monitors 230, 231 on the second portion 207a of the housing. When the tilt testing pattern image is displayed onto the screen of the monitors 230, 231, the worker compares the displayed pattern image with the reference patterns 232, 233 marked horizontally at the upper portion of the screen of the monitors 230, 231 and confirms the degree of tilt. If the degree of tilt is not proper, the cathode ray tube assembly 200 is adjusted, without manually moving the display device from either the pallet or the fixture. When the degree of tilt is connected, as described above, the worker assembles the cathode ray tube assembly 200 and the front case 201 using a fastener and presses end switch 209. This completes the tilt checking and correction.

When the end switch 209 is pressed, the main controller checks via the front check sensors 223, 224 whether the anode voltage supply member 217 and the closed circuit forming member 218 are attached to the cathode ray tube. If they are, the main controller moves only the anode voltage supply member 217 back. If the rear check sensor 226 senses that the anode voltage supply member 217 is detached, the rear check sensor 225 checks whether the high voltage discharge member 221 is dettached. If the high voltage discharge member 221 is not attached to the cathode ray tube, the main controller moves the high voltage discharge member 221 to contact the anode of the cathode ray tube assembly for a predetermined time period.

When the high voltage discharge member 221 contacts the anode, the high voltage that fills the cathode ray tube assembly 200 is bypassed to the printed circuit board assembly for used of tilt test via the high voltage discharge member 221 and the closed circuit forming member 218. Thus, the worker may not be shocked in the subsequent processing line.

Then, the high voltage, i.e., an anode voltage, is discharged and a predetermined time period has elapsed, the high voltage discharge member 221 is detached from the cathode ray tube. Then, the front check sensor 224 senses whether the closed circuit forming member 218 is attached to the cathode ray tube. If it is, the closed circuit forming member 218 is detached to cutoff the closed circuit connected to the cathode ray tube assembly 200. In addition, the deflection voltage supply member 220 is controlled so as to be isolated from the deflection yoke connector. When the deflection voltage supply member 220 is so-isolated, the worker separates the aging socket jig 219 that is inserted to the neck portion of the cathode ray tube assembly 200, to thereby complete the tilt testing.

When the tilt testing is completed and the end switch 209 is pressed, the elevation member 214 shown in FIG. 6 is moved back to its original position, lowering the fixture 210 under conveyor belt 203, as shown in FIG. 6A. The cathode ray tube assembly 200 for which the tilt adjustment is completed is dismounted from the fixture 210 and put on the conveyor belt 203. Then, the cathode ray tube assembly 200 is transported to the second conveyor 204 by an operation of the conveyor belt 203.

The third sensor 213 installed in the rear of second conveyor 204 checks whether the cathode ray tube assembly 200 is completely ejected from conveyor belt 203, and waits until the next cathode ray tube assembly has arrived through first conveyor 202.

Figure 8A:
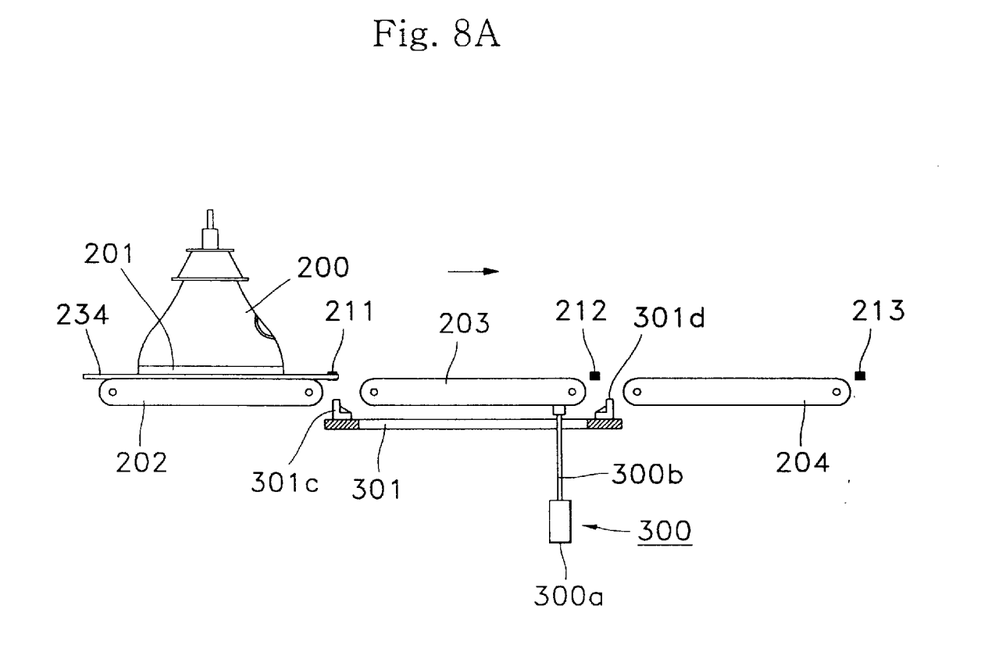
FIG. 8A is a front view showing the to-be-checked cathode ray tube assembly before moving to the conveyor belt positioned at the fixture.
Figure 8B:
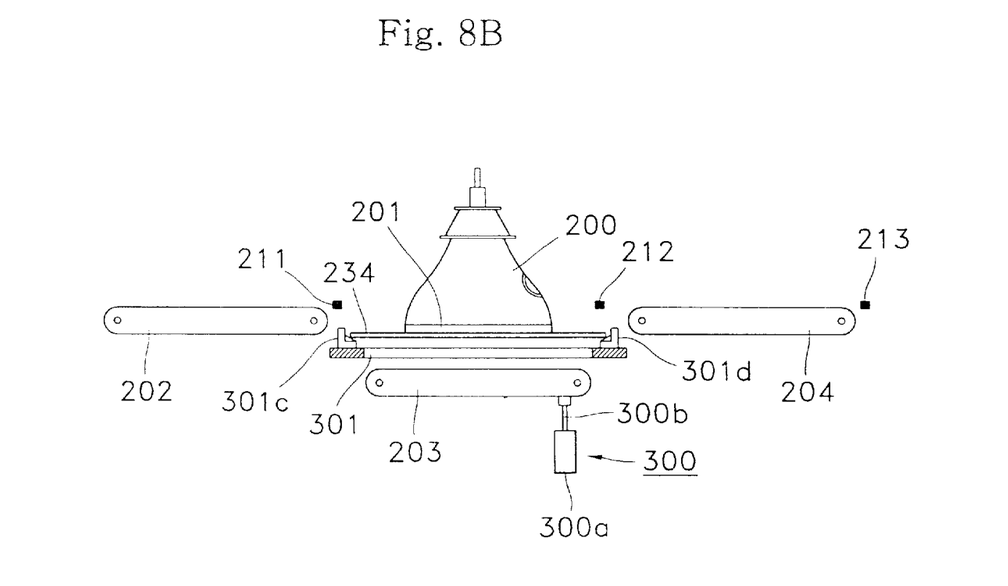
FIG. 8B is a front view showing the conveyor belt which is lowered when the to-be-checked cathode ray tube assembly is introduced onto the conveyor belt positioned at the fixture.

As another embodiment of the present invention, protrusions of fixture 301 are fixed onto the frame in such a manner that the protrusions are in parallel with the bottom surface of the conveyor belt 203 which is movable up and down by an elevation member 300, as shown in FIGS. 8A and 8B. Moving rod 300b that is connected to cylinder 300a is coupled to conveyor belt 203 to avoid clogging the operation of the conveyor belt 203, and moves the second conveyor belt 203 up and down. In this embodiment of the present invention, protrusions 301c, 301d formed on each corner have the same height. The automatic mounting and dismounting apparatus according this embodiment of the present invention operates as follows. First, the third sensor 213 installed in the rear of the second conveyor 204 checks whether the cathode ray tube assembly for which the tilt test is finished has completely left conveyor belt 203.

If the cathode ray tube has completely left conveyor belt 203, a new cathode ray tube assembly 200 is moved from the first conveyor 202 toward conveyor belt 203. If the cathode ray tube assembly 200 has moved to conveyor belt 203, the cylinder 300a of the elevation member 300 operates so as to lower conveyor belt 203, which is coupled to the moving rod 300b, until the conveyor belt 203 is below fixture 301 by a predetermined distance, as shown in FIG. 8B.

Then, the cathode ray tube assembly on the second conveyor is lowered at the same time. However, the cathode ray tube assembly is caught by the protrusions 301c, 301d of the fixture 301 so as to be fixed onto the fixture 301. The fixture 301 is always fixed to the conveyor belt frame under the conveyor belt 203. When the worker finished adjustment of the degree of tilt of the cathode ray tube assembly 200 mounted onto the fixture 301 using the tilt adjusting apparatus installed in the second portion 207a of the housing, he or she presses the end switch.

Subsequently, conveyor belt 203 is raised by elevation member 300 to its original position, and the cathode ray tube assembly for which the tilt adjustment is completed is dismounted from the fixture 301 and put on conveyor belt 203. Then, the display device is transported toward the second conveyor 204.

Then, similarly to the previous embodiment, the third sensor 213 senses whether the cathode ray tube assembly for which the tilt test is finished has completely escaped from conveyor belt 203, and waits until a new cathode ray tube assembly is arrived through the first conveyor 202. Differently from the conventional apparatus where the worker carries by hands the to-be-checked cathode ray tube assembly to the fixture, and carries again the cathode ray tube assembly for which the tilt adjustment is finished to the next conveyor belt, the cathode ray tube assembly is automatically transported between the fixture and the conveyor belt without the help of worker in the present invention.

The present invention has the following advantages. An efficient tilt testing can be performed while minimizing the work process and time period for tilt testing, which enhances productivity. Furthermore, time delay caused by manual carrying by workers is reduced, and damage to the image display device can be reduced. As a result, the overall level of quality of the image display devices that are produced can be increased.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method of disengaging and re-engaging a display device with a conveyor belt, said method comprising the steps of:
    elevating a fixture positioned underneath said conveyor belt to a position where a topmost portion of said fixture is aligned with an upper surface of said conveyor belt, said fixture capable of supporting said display device;
    mounting said display device onto said fixture by elevating said fixture above said upper surface of said conveyor belt, when said display device is completely aligned over said fixture, thus causing said display device to be lifted off of said conveyor belt by said fixture;
    checking and adjusting a tilt of said display device by testing the relative positioning of a cathode ray tube relative to a front housing of said display device via a tilt testing pattern; and
    returning said display device to said conveyor belt by lowering said fixture below said conveyor belt to re-engage said display device with said conveyor belt.

2. The method of claim 1, further comprising the steps of:
    determining when said display device starts to pass over said fixture prior to said step of elevating said fixture; and
    sensing when said display device is fully aligned over said fixture prior to said step of mounting said display device onto said fixture.

3. A method of disengaging and re-engaging a display device with a conveyor belt, said method comprising the steps of:
    mounting said display device onto a fixture, positioned below a moveable portion of said conveyor belt, by lowering said movable portion of said conveyor belt below said fixture, while said display device is fully aligned over said movable portion of said conveyor belt;
    checking and adjusting a tilt of said display device by testing the relative positioning of a cathode ray tube relative to a front housing of said display device via a tilt testing pattern; and
    returning said display device to said conveyor belt by elevating said movable portion of said conveyor belt above said fixture, thus lifting said display device off of said fixture, and aligning said movable portion of said conveyor belt with said conveyor belt to allow said display device to continue to be transported via said conveyor belt.

4. A method of disengaging and re-engaging a cathode ray tube assembly with a conveyor belt, said method comprising the steps of:
    elevating a fixture positioned underneath said conveyor belt to a position where a top most portion of said fixture is aligned with an upper portion of said conveyor belt, said fixture being capable of supporting said cathode ray tube assembly;
    mounting said cathode ray tube assembly onto said fixture by elevating said fixture above said conveyor belt when said cathode ray tube assembly is fully aligned over said fixture;
    providing said cathode ray tube assembly with a high voltage, a deflection voltage, and a tilt testing pattern;
    testing a relative positioning of a cathode ray tube relative to a front housing of said cathode ray tube assembly using said tilt testing pattern that is displayed on a screen of said cathode ray tube;
    adjusting said relative positioning of said cathode ray tube, as necessary, to properly align said cathode ray tube with said front housing of said cathode ray tube assembly;
    further securing said front housing to said cathode ray tube; and
    returning said cathode ray tube assembly to said conveyor belt by lowering said fixture below said conveyor belt and re-engaging said cathode ray tube assembly with said conveyor belt.

5. The method of claim 4, further comprising the step of inserting a cushion member between said cathode ray tube assembly and said conveyor belt prior to the step of elevating a fixture positioned underneath said conveyor belt.

6. A device for disengaging and re-engaging a display device with a conveyor belt, said device comprising:
    a housing supporting a conveyor belt, said housing having a first portion disposed below said conveyor belt and having a second portion disposed along a lateral side of said conveyor belt;
    a fixture movably positioned underneath said conveyor belt;
    an elevation member enclosed in said first portion of said housing, supporting said fixture, and capable of raising said fixture above said conveyor;
    a plurality of sensors for sensing when said display device is beginning to transport over said fixture, when said display device is fully aligned over said fixture, and when said display device is fully transported past said fixture;
    a controller in communication with said plurality of sensors and capable of causing said elevation member to raise said fixture above said conveyor belt to remove a display device from said conveyor belt; and
    said device positionable between a first conveyor and a second conveyor that are linearly aligned to allow the removal of any said display device that is transported along said first conveyor and said second conveyor.

7. The device of claim 6, with said plurality of sensors further comprising:
    a first sensor for determining when said displayed device is beginning to transport onto said conveyor belt supported by said housing;
    a second sensor for determining whether said display device is fully aligned over said fixture; and
    a third sensor for determining whether said display device has fully transported off of said conveyor belt supported by said housing.

8. The device of claim 7, with said fixture further comprising:
    said fixture has a size corresponding that of said display device;
    said fixture bears an opening through which said conveyor belt can pass when said fixture is raised above said conveyor belt; and
    a plurality of protrusions each in a separate corner of said fixture for engaging said display device.

9. The device of claim 8, with said plurality of protrusions further comprising two of said plurality of protrusions that said display device first reaches during transportation across said conveyor belt being of lesser height than the remaining two of said plurality of protrusions.

10. The device of claim 9, further comprising a cushion member that protects a screen of said display device being inserted between said display device and said conveyor belt.

11. The device of claim 10, with said cushion member further comprising a plurality of portions that correspond to said protrusions that are cut away, and bearing an opening allowing said screen of said display device can be seen.

12. The device of claim 9, further comprising:
   an anode voltage member attached to said second portion of said housing supplying a voltage to a cathode ray tube of said display device;
   said cathode ray tube displaying a tilt test pattern on a screen while said anode voltage member supplies said voltage;
   a camera attached to said first portion of said housing observing said screen of said display device; and
   a monitor attached to said second portion of said housing and in communication with said camera, said monitor displaying said tilt test pattern displayed on said screen of said cathode ray tube and allowing the testing of a relative position between said cathode ray tube and a front housing of said display device.

13. The device of claim 12, further comprised of said elevation member comprising a transportation rod attached at one end to said fixture, and a cylinder attached to another end of said transportation to linearly move said transportation rod.

14. A device for disengaging and re-engaging a display device with a conveyor belt, said device comprising:
   a housing supporting a conveyor belt, said housing having a first portion disposed below said conveyor belt and having a second portion disposed along a lateral side of said conveyor belt;
   a fixture movably positioned underneath said conveyor belt;
   an elevation member enclosed in said first portion of said housing, supporting said fixture, and capable of raising said fixture above said conveyor;
   a plurality of sensors for sensing when said display device is beginning to transport over said fixture, when said display device is fully aligned over said fixture, and when said display device is fully transported past said fixture;
   a controller in communication with said plurality of sensors and capable of causing said elevation member to raise said fixture above said conveyor belt to remove a display device from said conveyor belt;
   means for supplying a voltage, a deflection voltage, and a tilt test pattern to a cathode ray tube of said display device while said cathode ray tube is engaged with said fixture;
   a camera attached to said first portion of said housing and observing said screen of said display device; and
   a monitor attached to said second portion of said housing and in communication with said camera, said monitor displaying said tilt test pattern displayed on said screen of said cathode ray tube and allowing the testing of a relative position between said cathode ray tube and a front housing of said display device; and
   said device positionable between a first conveyor and a second conveyor that are linearly aligned to allow the removal of any said display device that is transported along said first conveyor and said second conveyor.

15. The device of claim 14, further comprised of said elevation member comprising a transportation rod attached at one end to said fixture, and a cylinder attached to another end of said transportation to linearly move said transportation rod.

16. The device of claim 15, with said fixture further comprising:
   said fixture has a size corresponding that of said display device;
   said fixture bears an opening through which said conveyor belt can pass when said fixture is raised above said conveyor belt; and
   a plurality of protrusions each in a separate corner of said fixture for engaging said display device.

17. The device of claim 16, with said plurality of protrusions further comprising two of said plurality of protrusions that said display device first reaches during transportation across said conveyor belt being of lesser height than the remaining two of said plurality of protrusions.

18. The device of claim 17, further comprising a cushion member that protects a screen of said display device being inserted between said display device and said conveyor belt.

19. The device of claim 18, with said cushion member further comprising a plurality of portions that correspond to said protrusions that are cut away, and bearing an opening allowing said screen of said display device can be seen.

* * * * *